July 3, 1956  J. R. FREEZE  2,752,873
METHOD AND APPARATUS FOR FEEDING AND FORMING
SHEET STRIP STOCK INTO A HELIX
Original Filed Feb. 17, 1948  4 Sheets-Sheet 1

INVENTOR.
JONATHAN ROY FREEZE,
BY
*Allen & Allen*
ATTORNEYS.

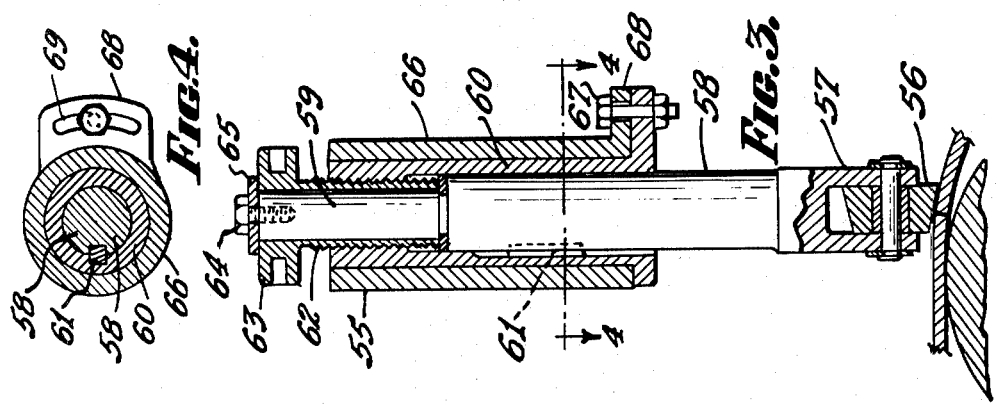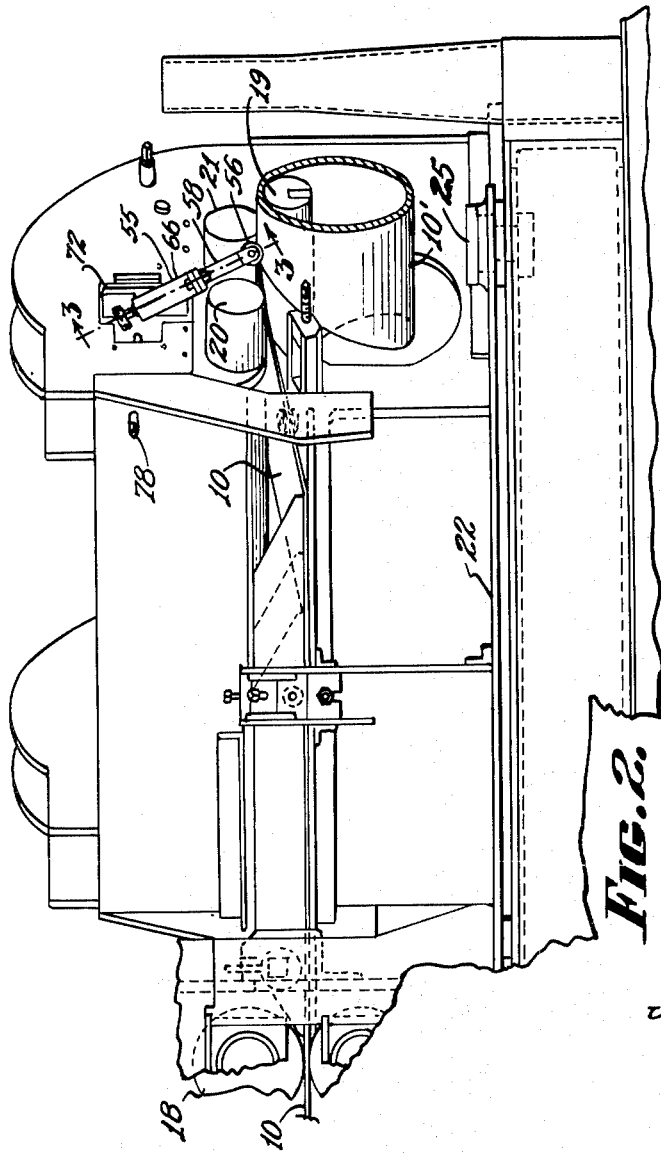

July 3, 1956 J. R. FREEZE 2,752,873
METHOD AND APPARATUS FOR FEEDING AND FORMING
SHEET STRIP STOCK INTO A HELIX
Original Filed Feb. 17, 1948 4 Sheets-Sheet 3

INVENTOR.
JONATHAN ROY FREEZE,
BY Allen & Allen
ATTORNEYS.

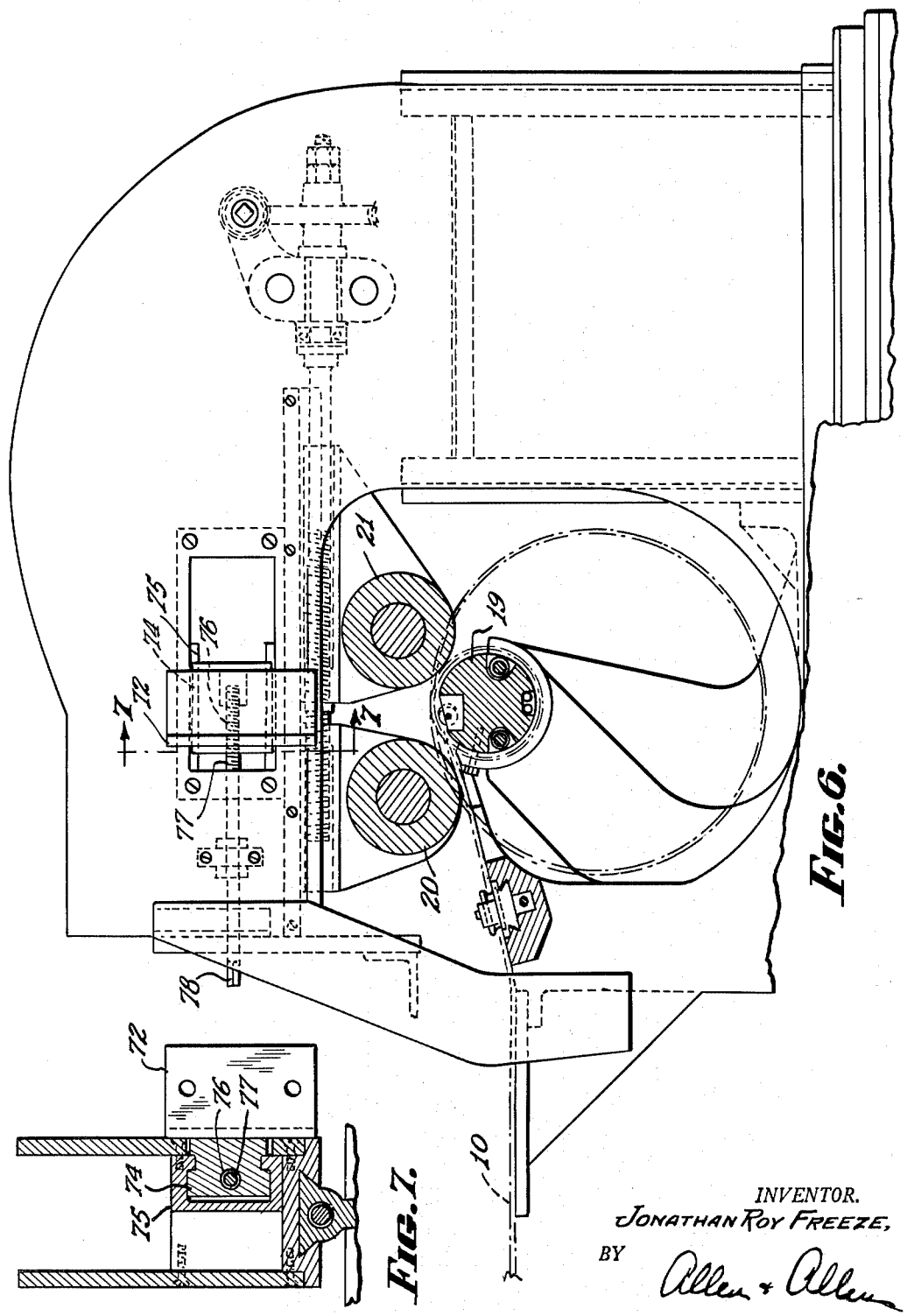

United States Patent Office 2,752,873
Patented July 3, 1956

2,752,873

METHOD AND APPARATUS FOR FEEDING AND FORMING SHEET STRIP STOCK INTO A HELIX

Jonathan Roy Freeze, Middletown, Ohio, assignor to Armco Steel Corporation, Middletown, Ohio, a corporation of Ohio Application June 28, 1949, Serial No. 101,883, which is a division of application Serial No. 8,758, February 17, 1948, now Reissue Patent No. 23,316, dated January 2, 1951. Divided and this application May 11, 1951, Serial No. 225,716

6 Claims. (Cl. 113—35)

This invention relates to a method and apparatus for feeding and forming sheet strip stock into a helix, and this application is a division of my copending application Serial No. 101,883, filed June 28, 1949, which in turn is a division of my application, Serial No. 8,758, filed February 17, 1948, now Reissue Patent 23,316, dated January 2, 1951.

Spiral welded pipe have been made from flat rolled metal for a number of years and such pipe has been more or less commercially successful. For example, pipe has been made commercially for many years in accordance with the teachings of my earlier Patents Nos. 1,793,281 and 1,793,282, dated February 17, 1931, but the manufacture of pipe in accordance with the principles therein set forth has always been attended by a great many difficulties.

Flat rolled metal from which spiral welded pipe is made, and indeed any flat metal piece produced by rolling, is characterized by camber and this camber is not uniform, may not be compensating and is generally unpredictable. When such cambered flat metal is formed into a helix in the absence of special precautions, the pipe which is produced will either not be of uniform diameter, or it will have imperfect welds. Both of these results render the pipe commercially unsaleable. Numerous attempts have been made since the date of my earlier patents to avoid the difficulties mentioned above, none of which has been completely satisfactory.

It is therefore one of the objects of my invention to provide a method of making spiral pipe in accordance with which the difficulties arising from camber in the flat rolled metal are compensated to provide for perfect welds, and substantially constant diameter pipe. In this connection it is also an object of my invention to provide a mechanism for controlling the position of the metal edges in the region of the weld for the same purpose.

The foregoing and other objects of the invention which will be discussed in more detail hereinafter, or which will be apparent to one skilled in the art upon reading these specifications, are accomplished by that certain construction and arrangement of parts and by that series of method steps of which the following are exemplary embodiments. Reference is made to the drawings forming a part hereof, and in which:

Figure 2 is an enlarged fragmentary elevational view taken on the line 2—2 of Figure 1.

Figure 3 is an enlarged detailed sectional view taken on the line 3—3 of Figure 2.

Figure 4 is a cross sectional view taken on line 4—4 of Figure 3.

Figure 6 is an enlarged sectional view taken on line 6—6 of Figure 1.

Figure 7 is a sectional view taken on the line 7—7 of Figure 6.

Throughout these specifications I have used the word stock to designate the flat rolled metal which is formed into a helix and welded to produce the finished pipe.

Figure 1:
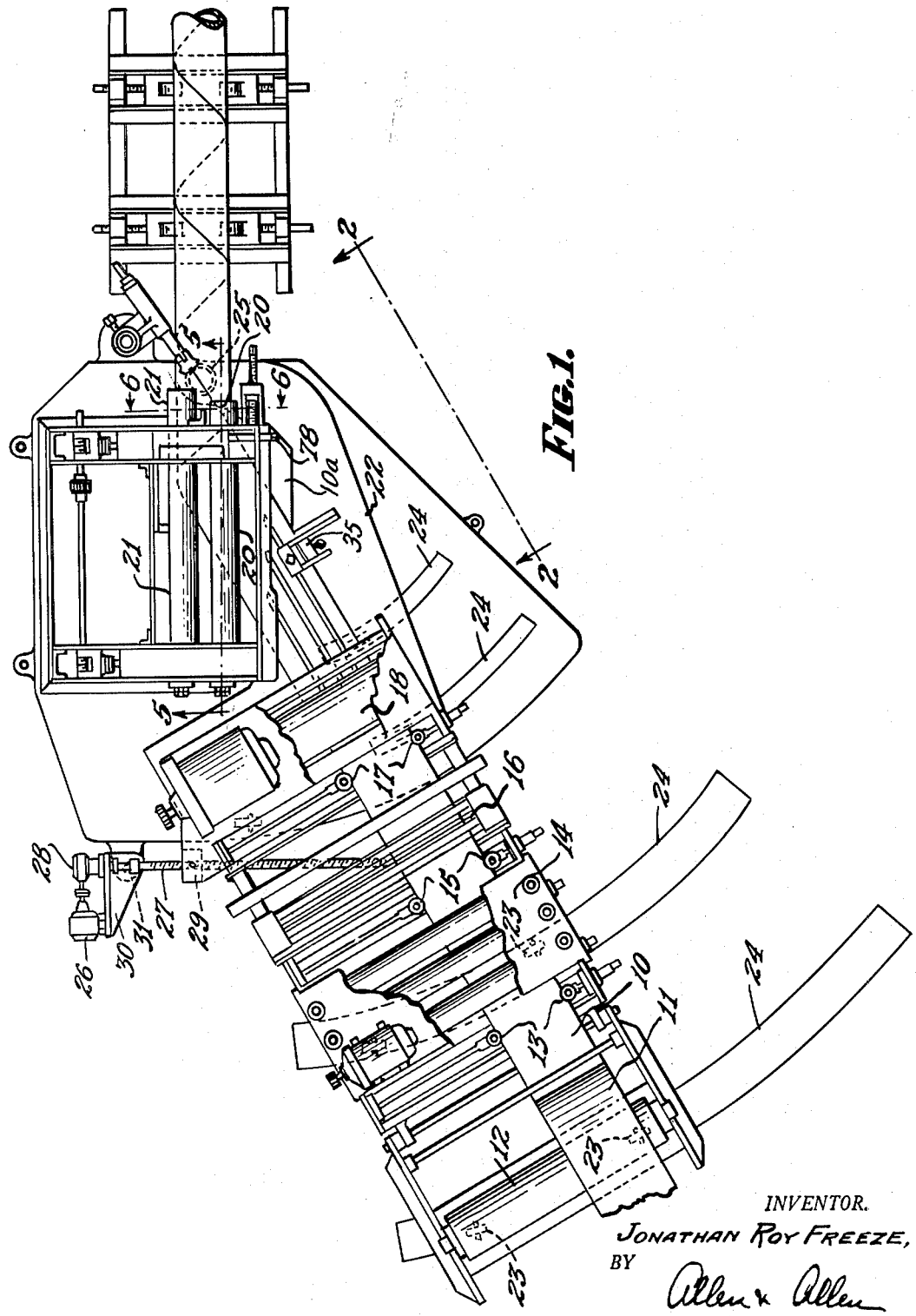
Figure 1 is a general plan view of the machine with certain parts broken away and other parts removed for clearer understanding.

The general layout of the machine is perhaps best seen in Figure 1. The metal stock 10 is uncoiled from a coil 11, on the reel 12, and passes between edge guide rollers 13, through a roller leveler indicated generally at 14. It then passes between another pair of edge guiding rollers 15, to the welding station indicated generally at 16. At the welding station 16, the ends of the succeeding coils are butt welded together so that pipe can be formed continuously.

Passing between another pair of edge guide rollers 17, the stock passes through the driving roll unit indicated generally at 18. It is the unit 18 which thrusts the stock into the forming mechanism where it is formed into a helix.

When the stock issues from the driving unit 18 it is moving in a substantially horizontal plane and in order to enter the forming mechanism it must ride up an inclined plane as indicated at 10a in Figure 1. The forming means comprises essentially a fixed bending knee indicated generally at 19 and the heel roller 20 and buttress roller 21. The stock passes over the knee 19 and under the rolls 20 and 21. Since the stock enters the forming mechanism at an angle, the forming means bends the stock to form it into a helix, and as a convolution is formed its rear edge comes to a position adjacent the forward edge of the entering stock, and substantially at this point the weld is made. The portion of the machine including the coil reel, leveler, welding station and driving rolls, is mounted on a frame indicated generally at 22, which frame is provided with casters 23 riding on the curved rails 24, and the entire unit and the frame 22 is swung about the pivot point 25 to produce the desired helical angle. This is accomplished by means of a motor 26 driving the screw 27 through the gear reducer 28. The screw 27 engages to a nut 29 which is a part of the swingable frame. The motor, gear reducer and screw are mounted upon a bracket 30 which is pivoted at 31, and it will be clear that the motor 26 in turning will cause the feed unit to be moved in an arcuate path about the pivot point 25.

Having thus described in a more or less general way the machine as a whole, that portion thereof relating to the feeding and forming sheet strip stock into a helix and concurrently correcting irregularities at the seam due to the camber of the stock will be described in greater detail. The details of the edge bending apparatus 35 are described and claimed in my copending application Serial No. 225,715 filed May 11, 1951. The details of the backing shoe used in connection with the welding operation are described in my said Letters Patent, and the details as to the forming of the sheet into the helix and the details of the bending knee are disclosed and claimed in my copending application Serial No. 8758, filed June 28, 1949.

Figure 13:
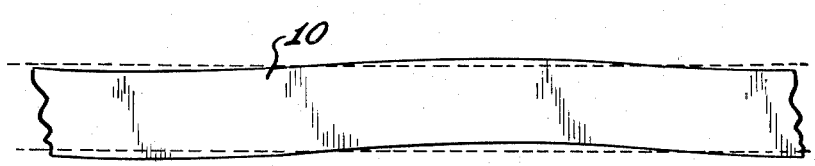
Figure 13 is a plan view of a section of stock illustrating camber.

Flat rolled metal stock such as is used in the manufacture of spiral welded pipe is generally characterized by camber. This condition is illustrated in Figure 13 in which the solid lines represent the actual stock edges. It is this condition shown in Figure 13 which is generally known as camber. One of the great difficulties heretofore had in the manufacture of spiral welded pipe has been occasioned by camber in the stock, which camber is not uniform and which may or may not be cumulative. In the manufacture of spiral welded pipe from stock thus characterized by camber, one or both of two possible defects will appear in the final pipe. Either the pipe will be characterized by imperfect welds, or the pipe will be of non-uniform diameter, or both.

According to the present invention the difficulties which arise by reason of camber in the stock are overcome by means of what will be referred to hereinafter as a vernier control. This vernier control is best seen in Figures 2 and 3 and is generally indicated at 55.

Referring first to Figure 3, a roller 56 is journaled as shown in a fork 57, on the end of the ram 58. The ram 58 has a portion of reduced diameter 59 and is mounted for slidable movement axially in a sleeve 60. It is held against rotation in the sleeve 60 by means of a key 61 riding in a keyway in the portion 58. The portion 59 is surrounded by a threaded sleeve 62, provided with a turret head 63 which is secured to the portion 59 by means of a bolt 64 threaded into the end of the portion 59 and bearing against a washer 65 extending partially over the turret head 63. The threads of the sleeve 62 engage external threads in the upper portion of the sleeve 60, and it will be clear from the foregoing description that as the turret head 63 is turned the ram 58 with its roller 56, is moved up and down axially of the ram, as seen in Figure 3.

The sleeve 60 fits into a sleeve 66 and the flanges of the sleeves 60 and 66 are secured together by means of the nut and bolt indicated generally at 67, passing through perforations in the flanges. The flange 68 and the sleeve 66 is provided with an arcuate slot 69 best seen in Figure 4, so that the sleeve 60 together with the ram 58 and roller 56 may be adjusted about the axis of the ram 58. This adjustment is made to cause the axis of the roller 56 to be normal to the mating edges of the strip.

Figure 5:
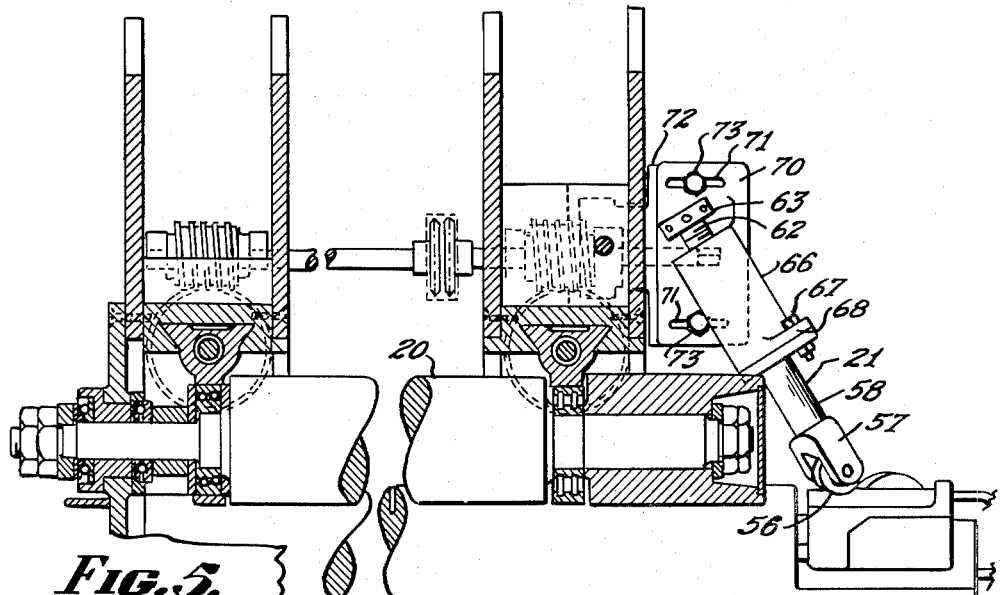
Figure 5 is a detailed sectional view taken on line 5—5 of Figure 1.

The sleeve 66 in which the parts above described are mounted, is integral with a plate 70 (Figure 5) which is provided with the slots 71. The plate 70 is bolted to a plate by means of the bolts 73. By virtue of the slots 71 the position of the plate 70 with respect to the plate 72 may be adjusted in a direction parallel to the axis of the forming device. The plate 72 (see Figures 6 and 7) has a portion 74 riding in ways 75 and has a threaded hole 76 for the screw 77. Thus, by rotating the screw 77 the portion 74, together with the plate 72 and all the heretofore described parts carried by said plate, may be moved to the left or right of Figure 6 to adjust the position of the roller in a direction normal to the axis of the forming mechanism. This last adjustment is effected by the application of a suitable wrench, or the like, to the squared end 78 of the screw.

There are thus four adjustments for the roller 56:

(a) The entire mounting may be moved back and forth on a line normal to the axis of the forming means, by screw 77.

(b) The entire mechanism may be adjusted back and forth on a line parallel to the axis of the forming mechanism, by slots 71 and bolts 73.

(c) The angular position of the roller axis may be adjusted by slot 69 and bolt 67, and (d) The roller may be adjusted in and out substantially radially of the pipe being formed by turret head 63.

In practice the first three of the above named adjustments are made on the basis of the helical angle being used and the diameter of the pipe being formed. The last adjustment by means of the turret nut 63 is made during the forming operation by the operator.

Figure 8:
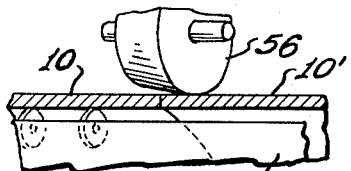
Figure 8 is a diagrammatic sectional view through the upper convolutions of a pipe, axially thereof, showing the vernier control.
Figure 9:
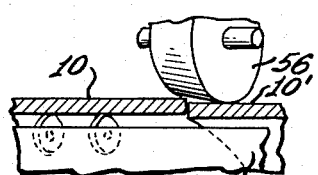
Figure 9 and Figure 10 are similar to Figure 8 but showing different conditions.
Figure 10:
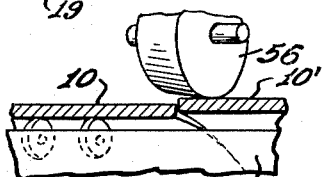

Referring now to Figures 8 to 10 inclusive, there is shown a roller 56 in relation to the meeting stock edges just prior to the welding station. The ingoing stock is again shown at 10 and the first convolution of the stock after passing around the bending knee is indicated at 10'.

In the forming of the stock into a helix the incidence of camber in the strip will cause the adjacent edges of the stock at 10 and 10' to move apart or crowd together and the roller 56 is used to compensate for camber in the following manner:

In Figure 9 let it be assumed that the edges of the stock at 10 and 10' have begun to get too close together. The operator will operate the turret nut 63 to cause the roller 56 to bear down against the loop portion 10' to depress it slightly below the entering portion 10. This condition is exemplified in Figure 9. This tends to make the pipe diameter smaller and the operator can tell by inspection when the edges of the stock portions at 10 and 10' are again correctly spaced. The normal condition, of course, is shown in Figure 8 where the portions 10 and 10' are lined up directly edge to edge with neither side being depressed below the other.

If it be assumed that the edges of the stock at 10 and 10' are gradually becoming separated, the operator will adjust the turret screw 63 to raise the roller 56 so as to permit the loop portion 10' to rise slightly above the entering stock at 10. The operator continues to watch the relationship between the parts 10 and 10' until a proper spacing of the edges is re-established and then readjusts the positions of the roller 56 to normal. Thus the operator by simply watching the formation of the seam and controlling the position of the roller 56 can insure the formation of a perfect, continuous, weld and the maintenance of substantially constant diameter in the finished pipe.

Figure 12:
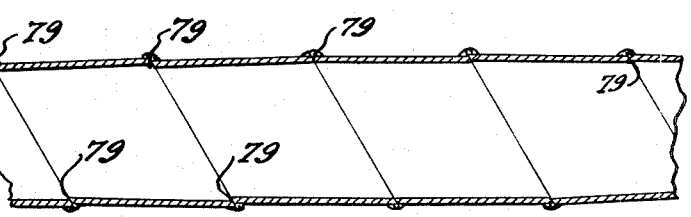
Figure 12 is a typical longitudinal sectional view through a pipe according to the invention.

The formed pipe as shown in Figure 12 will here and there be characterized by very slightly stepped configurations as indicated at 79. The condition is considerably exaggerated in Figure 12 and actually the pipe diameter is substantially constant. The slight variations indicated at 79 compensate for the camber in the strip and prevent the pipe diameter from changing substantially in one direction or the other.

Figure 11:
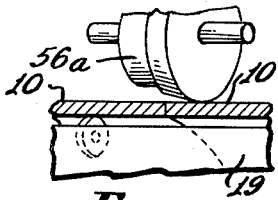
Figure 11 is similar to Figures 8 and 10 but shows a modification.

While the roller 56 has been shown as being slightly tapered and bearing primarily upon the loop portion 10', and a similar result may be obtained by means of a stepped roller as indicated at 56a in Figure 11. This seam can be controlled by a roller bearing against the entering stock at 10 and in its broadest aspect this invention includes such a structure; but it has been found that the loop portion 10' which is free more or less so that it can be depressed below the entering portion 10 and so that it can spring up thereabove, is more susceptible to control than the entering stock portion and Figures 8 to 11 are illustrative of the preferred way of controlling the seam.

During the operation of the machine the vernier control 55 is adjusted according to the helical angle being used and the diameter of the pipe to be formed on a line normal to the axis of the forming means 19, 20 and 21 and also on a line parallel to this axis. The angular position of the axis of the roller 56 is also set. As the metal stock is fed into and passes through the machine the operator will adjust the roller 56 of the vernier arrangement 55 by moving it in and out substantially radially of the pipe being formed according to the amount the pipe development is affected by camber in the metal stock. By this arrangement of parts spiral welded pipe of high quality may be continuously produced.

The actual welding head and its associated mechanisms are not described in detail as they form no part of the present invention.

While certain aspects of the invention have been described in considerable detail, this has been primarily by way of illustration. Many modifications may be made in details of construction without departing from the spirit of the invention.

Having now fully described the invention, what I claim as new and desire to secure by Letters Patent is:

1. The method of making spiral welded pipe from metal stock characterized by camber which includes the steps of forming said stock into a helix with substantially meeting stock edges, continuously adjusting the relative radial position, with regard to the pipe axis, of said substantially meeting edges in accordance with the camber of said strip, and welding said edges continuously in their adjusted relative position.

2. The method of making spiral welded pipe from metal stock characterized by camber, which includes the steps of forming said stock into a helix with substantially meeting stock edges, continuously adjusting the radial position, with regard to the pipe axis, of one of said edges in relation to the other in accordance with the camber of said stock, and welding said edges continuously in their adjusted relative position.

3. The method of making spiral welded pipe from metal stock characterized by camber, which includes the steps of forming said stock into a helix with substantially meeting stock edges, continuously adjusting the radial position, with regard to the pipe axis, of the edge of said first convolution in relation to the adjacent edge of the entering stock in accordance with the camber of said stock, and welding said edges continuously in their adjusted relative position.

4. The method of making spiral welded pipe from metal stock characterized by camber, which includes the steps of forming said stock into a helix with substantially meeting stock edges, continuously depressing the edge of the first convolution below the adjacent edge of the entering stock to counteract a coming together of said edges due to said camber, and permitting the edge of the first convolution to spring above the adjacent edge of the entering stock to counteract a spreading apart of said edges due to said camber and welding said edges continuously in their adjusted relative position.

5. In a machine for making spiral welded pipe from metal stock having means for feeding stock and means for forming said stock into a helix with the edges of succeeding convolutions in substantially butted relation for welding, said stock being characterized by camber, means for insuring a continuously perfect seam and substantially constant pipe diameter notwithstanding camber, comprising a roller positioned to ride said butted edges substantially as they come together and before said edges are welded together and in contact with one at least of said edges, and means for adjusting the position of said roller radially of the pipe, to cause said edges to come closer together by permitting one edge of a convolution to spring above the edge of an adjacent convolution or permit them to be spaced farther apart by depressing one edge of a convolution below the edge of an adjacent convolution to compensate for said camber, said machine having a frame, a sleeve mounted on said frame, a second sleeve disposed within said first sleeve, means for rotationally adjusting said second sleeve in relation to said first sleeve, a ram member non-rotationally disposed within said second sleeve, and means for adjusting said ram member axially with respect thereto, said ram member carrying said roller.

6. A device according to claim 5, in which the mounting of said first sleeve includes a provision for adjustment thereof parallel to and normal to the formed pipe axis.

References Cited in the file of this patent

UNITED STATES PATENTS

| | | |
|---|---|---|
| 1,659,754 | Thorsby | Feb. 21, 1928 |
| 1,659,792 | Thorsby | Feb. 21, 1928 |
| 1,793,281 | Freeze | Feb. 17, 1931 |
| 1,868,039 | Williams | July 19, 1932 |
| 1,929,415 | Force | Oct. 10, 1933 |
| 2,155,859 | Harford | Apr. 25, 1939 |

FOREIGN PATENTS

| | | |
|---|---|---|
| 482,413 | Great Britain | Mar. 29, 1938 |